United States Patent
Kusuyama

(10) Patent No.: US 7,743,631 B2
(45) Date of Patent: Jun. 29, 2010

(54) METHOD OF FORMING AN OPTICAL LENS BY DRAWING MATERIAL WITH CURVED SURFACE PARTS

(75) Inventor: Yutaka Kusuyama, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 616 days.

(21) Appl. No.: 10/476,868

(22) PCT Filed: May 8, 2002

(86) PCT No.: PCT/JP02/04496

§ 371 (c)(1),
(2), (4) Date: Nov. 5, 2003

(87) PCT Pub. No.: WO02/091036

PCT Pub. Date: Nov. 14, 2002

(65) Prior Publication Data

US 2004/0141236 A1 Jul. 22, 2004

(30) Foreign Application Priority Data

May 9, 2001 (JP) ............................. 2001-139226

(51) Int. Cl.
*C03B 23/047* (2006.01)
(52) U.S. Cl. ......................................... 65/102; 264/2.7
(58) Field of Classification Search .................. 65/102; 264/2.7
See application file for complete search history.

(56) References Cited

U.S. PATENT DOCUMENTS

| | | | |
|---|---|---|---|
| 2,151,573 A | 3/1939 | Stanley | 88/39 |
| 4,537,732 A * | 8/1985 | Ueda et al. | 264/1.1 |
| 4,986,939 A | 1/1991 | Hoffmann | 264/1.7 |
| 5,004,328 A | 4/1991 | Suzuki et al. | 350/416 |
| 5,080,706 A | 1/1992 | Snyder et al. | 65/102 |
| 5,081,639 A | 1/1992 | Snyder et al. | 372/101 |
| 5,155,631 A | 10/1992 | Snyder et al. | 359/708 |
| 5,293,269 A | 3/1994 | Burkhart et al. | 359/719 |
| 5,513,201 A | 4/1996 | Yamaguchi et al. | 372/75 |

(Continued)

FOREIGN PATENT DOCUMENTS

DE 198 19 333 A1 11/1999

(Continued)

*Primary Examiner*—John Hoffmann
(74) *Attorney, Agent, or Firm*—Drinker Biddle & Reath LLP

(57) ABSTRACT

An optical lens manufacturing method according to the present invention comprises: an optical lens base material preparation step of preparing an optical lens base material 40, which is formed of light transmitting material, has a columnar shape, and is provided with a first side face 44 and a second side face 46 that are mutually parallel, of which at least one of both first side face 44 and second side face 46 has a plurality of curved surface parts 43; a drawing step of drawing optical lens base material 40 in the columnar axis direction; and an optical lens preparation step of cutting optical lens base material 40, which has been drawn, at a desired length to thereby prepare optical lens 1. The plurality of curved surface parts 43 of optical lens base material 40, which has been drawn in the drawing step, function as optical action components that act on incident light or emitted light.

6 Claims, 9 Drawing Sheets

U.S. PATENT DOCUMENTS

| | | | |
|---|---|---|---|
| 5,596,671 A | 1/1997 | Rockwell, III | |
| 5,745,519 A | 4/1998 | Ruda et al. | 372/101 |
| 5,790,576 A | 8/1998 | Waarts et al. | 372/43 |
| 5,867,327 A | 2/1999 | Snyder | 359/710 |
| 6,015,976 A * | 1/2000 | Hatakeyama et al. | 250/492.23 |
| 6,137,633 A * | 10/2000 | Tanaka | 359/619 |
| 6,222,864 B1 | 4/2001 | Waarts et al. | 372/43 |
| 6,384,981 B1 | 5/2002 | Hauschild | 359/622 |
| 6,416,237 B2 | 7/2002 | Lissotschenko et al. | 385/88 |
| 6,471,372 B1 | 10/2002 | Lissotschenko et al. | 362/268 |
| 6,621,631 B2 | 9/2003 | Lissotshenko et al. | 359/566 |
| 2001/0043779 A1 | 11/2001 | Lissotschenko et al. | 385/88 |
| 2002/0102071 A1 | 8/2002 | Lissotschenko et al. | 385/88 |
| 2002/0129621 A1 | 9/2002 | Kusuyama | 65/61 |
| 2002/0191296 A1 | 12/2002 | Kusuyama | 359/619 |

FOREIGN PATENT DOCUMENTS

| | | |
|---|---|---|
| EP | 0 752 394 A2 | 1/1997 |
| GB | 2 108 483 A | 5/1983 |
| JP | 57-145040 | 9/1982 |
| JP | 57-169706 | 10/1982 |
| JP | 57-175739 | 10/1982 |
| JP | 57-181516 | 11/1982 |
| JP | 57-183328 | 11/1982 |
| JP | 58-168026 | 10/1983 |
| JP | 59-092935 | 5/1984 |
| JP | 63-008233 | 1/1988 |
| JP | 63-073483 | 5/1988 |
| JP | 02-311801 | 12/1990 |
| JP | 06-2311 | 1/1994 |
| JP | 06-15016 | 2/1994 |
| JP | 07-15521 | 2/1995 |
| JP | 07-098402 | 4/1995 |
| JP | 07-287104 | 10/1995 |
| JP | 07-291651 | 11/1995 |
| JP | 10-001321 | 1/1998 |
| JP | 10-096803 | 4/1998 |
| JP | 10-245236 | 9/1998 |
| JP | 2000-098191 | 4/2000 |
| JP | 1 006 382 A1 | 6/2000 |
| JP | 3121614 | 1/2001 |
| WO | WO 92/06046 | 4/1992 |
| WO | WO 97/21126 | 6/1997 |
| WO | WO 00/19248 | 4/2000 |
| WO | WO 01/35125 A1 | 5/2001 |
| WO | WO 01/35126 A1 | 5/2001 |
| WO | WO 01/35145 A1 | 5/2001 |
| WO | WO 01/35147 A1 | 5/2001 |
| WO | WO 02/090274 A1 | 11/2002 |

* cited by examiner

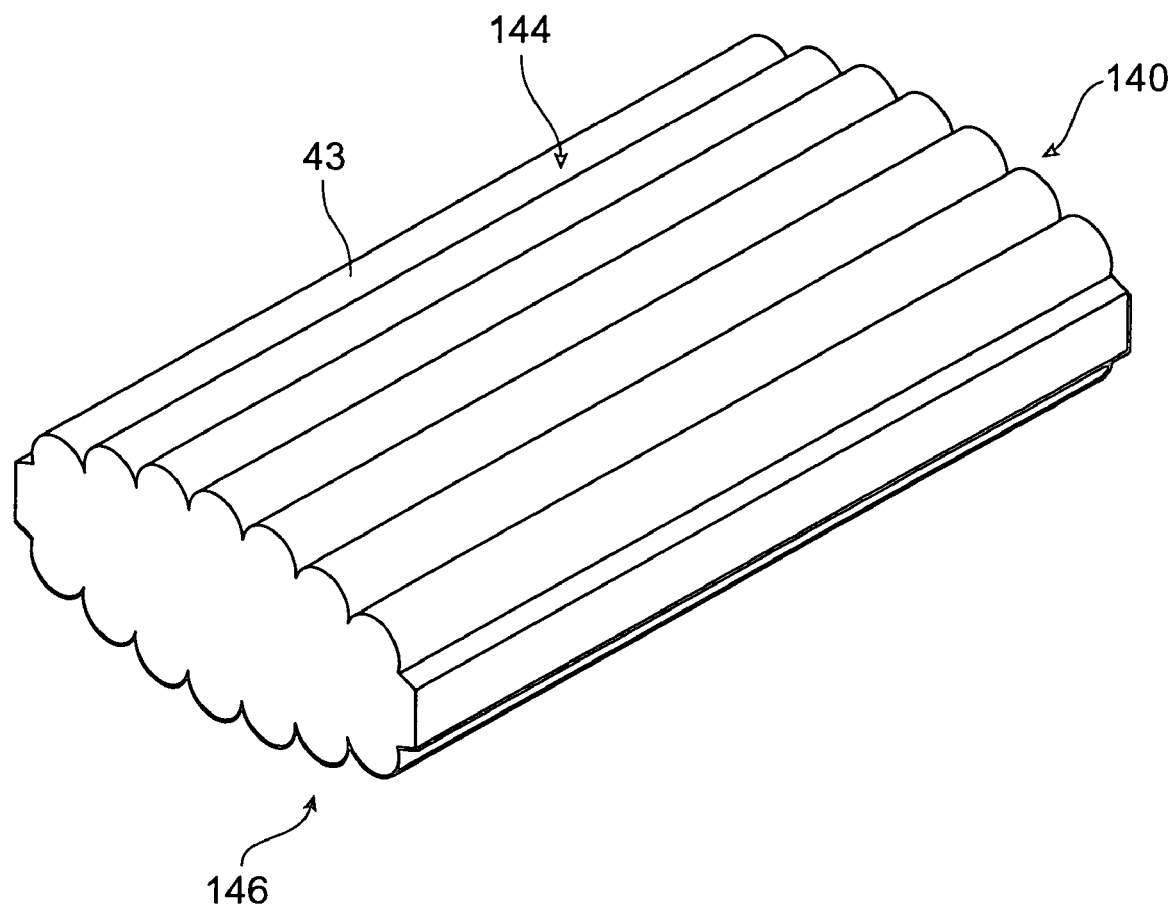

METHOD OF FORMING AN OPTICAL LENS BY DRAWING MATERIAL WITH CURVED SURFACE PARTS

FIELD OF THE ART

The present invention relates to an optical lens that acts on light emitted from a light emitting element and a method of manufacturing the optical lens.

BACKGROUND ART

The methods of manufacture by use of a precision mold and manufacture by application of a silicon semiconductor manufacturing process or LIGA process are known as the conventional methods of manufacturing an optical lens accommodating for a semiconductor laser element as a light emitting element in which a plurality of light emitting components are aligned.

DISCLOSURE OF THE INVENTION

However, since the size of the required optical lens is extremely microscopic in itself, it was extremely difficult to form optical action components that can collimate, converge, or perform optical path conversion of the respective light rays emitted from a semiconductor laser array by such conventional optical lens manufacturing methods.

An object of the present invention is to provide an optical lens manufacturing method, optical lens, and optical lens base material that enable optical action components to be formed readily.

In order to achieve the above object, the optical lens base material according to the present invention is an optical lens base material for drawing that is formed of light transmitting material and has a columnar shape, and in which the optical lens base material comprises a first side face and a second side face, disposed at the side opposite the first side face, and at least one of both the first side face and the second side face has a plurality of curved surface parts, formed parallel to the columnar axis direction and aligned so as to be in mutual contact.

According to such an optical lens base material, since an optical lens comprising an optical action component equipped with a plurality of curved surface parts is formed by drawing process, an optical lens, which can act on the respective lights emitted from a light emitting element in which a plurality of light emitting components are aligned, can be formed.

Here, "Curved surfaces parallel to the columnar axis direction" refer to curved surfaces, with which arbitrary sections perpendicular to the columnar axis direction 20 have the same arcuate shape as shown in FIG. 1A.

The first side face and the second side face are preferably formed as convex curved surfaces. In many cases, a drawing process is carried out so that throughout the drawing process, the first side face and the second side face of the optical lens base material are recessed inwards, but by forming the first side face and the second side face so as to be convex curved surfaces in advance, the influence of shape distortion due to the drawing process can be restrained.

The plurality of curved surface parts of the optical lens base material are preferably formed as aspherical surfaces.

An optical lens manufacturing method according to the present invention comprises: an optical lens base material preparation step of preparing any of the optical lens base materials as described above; a drawing step of drawing the optical lens base material, prepared in the optical lens base material preparation step, in the columnar axis direction; and an optical lens preparation step of preparing an optical lens by cutting the optical lens base material, which has been drawn in the drawing step, at a desired length; and the plurality of curved surface parts of the optical lens base material, which has been drawn in the drawing step, function as optical action components that act on incident light or emitted light.

An optical lens manufacturing method according to the present invention also comprises a drawing step of drawing any of the optical lens base materials described above in the columnar axis direction; and an optical lens preparation step of preparing an optical lens by cutting the optical lens base material, which has been drawn in the drawing step, at a desired length; and the plurality of curved surface parts of the optical lens base material, which has been drawn in the drawing step, function as optical action components that act on incident light or emitted light.

According to such an optical lens manufacturing method, since the shape of the optical lens, especially the shapes of the optical action components can be determined at a stage of the base material prior to drawing, the processing of the plurality of curved surface parts that are to become the optical action components can be performed at an adequately large size. Here, to "act on light" refers to emitting an incident light upon changing its angle of divergence or angle of convergence, or to perform optical path conversion of the incident light.

In the optical lens preparation step, the optical lens may be prepared by cutting the optical lens base material that has been drawn in the drawing step upon setting an inclination angle with respect to the columnar axis direction. An optical lens having a plurality of inclined curved surface parts as optical action components can thus be prepared.

The optical lens preparation step may contain: a first cutting step of preparing a cut preform by cutting the optical lens base material that has been drawn in the drawing step; and a second cutting step of preparing the optical lens by cutting the cut preform prepared in the first cutting step to a desired size. Here, the cut "preform" is the formed object immediately prior to preparation of the optical lens and refers to an optical lens intermediate.

In the second cutting step, the optical lens may be prepared by cutting the cut preform upon setting an inclination angle with respect to the columnar axis direction. An optical lens having a plurality of inclined curved surface parts can thus be prepared.

The first side face and the second side face may both have a plurality of curved surface parts and the inclination angle may be 45°. An optical lens, which emits light that is rotated with respect to the incident light by 90° about the optical axis as the central axis, can thereby be prepared.

An optical lens according to the present invention is an optical lens that is prepared by any of the above-described optical lens manufacturing methods.

The above-described optical lens base material is preferably equipped further with a pair of flange parts disposed along the columnar axis direction at the sides of the first side face and the second side face.

In an optical lens base material without flange parts, the respective sides of the first side face and the second side face, that is, the respective edge parts of the optical lens base material are strongly influenced by heating in the drawing step, causing deformation, etc. to occur readily at the curved surface parts. However, since a pair of flange parts are formed in the optical lens base material according to the present invention, and the flange parts receive the influence of heating in place of the curved surface parts, the influence of heating is avoided more readily at the curved surface parts.

An optical lens base material according to the present invention is also an optical lens base material having two opposing surfaces, in which at least one of the two surfaces has a plurality of cylindrical surfaces and these plurality of cylindrical surfaces are positioned so as to extend along the same direction.

According to such an optical lens base material, the shape of the optical lens, especially, the shapes of the optical action components can be determined at a stage prior to the drawing process, that is, at a stage of adequately large size, and the processing of the cylindrical surface parts that are to become the optical action components can be performed with precision. By drawing such an optical lens base material, an optical lens, equipped with a plurality of optical action components that act accurately on incident light, can be obtained.

The above-described optical lens base material is preferably equipped further with a pair of flange parts extending along the same direction as the cylindrical surfaces at the respective sides of the two surfaces.

In an optical lens base material without flange parts, the respective sides of the two opposing surfaces, that is, the respective edge parts of the optical lens base material are strongly influenced by heating in the drawing step, causing deformation, etc. to occur readily at the cylindrical surfaces. However, since in the optical lens base material according to the present invention, and a pair of flange parts are formed at the respective edge parts and the flange parts receive the influence of heating in place of the cylindrical surfaces, the influence of heating is avoided more readily at the cylindrical surfaces.

Further, the optical lens manufacturing method comprises: a drawing step of drawing the above-described optical lens base material; and an optical lens preparation step of preparing an optical lens by cutting the optical lens base material, which has been drawn in the drawing step, at a desired position.

According to such an optical lens manufacturing method, since the shape of the optical lens, especially the shapes of the optical action components can be determined at a stage of the base material prior to the drawing process, the processing of the plurality of cylindrical surfaces that are to become the optical action components can be performed with good precision at an adequately large size. Therefore, an optical lens, equipped with a plurality of optical action components that act accurately on incident light, can be obtained.

The above-mentioned optical lens preparation step may contain: a first cutting step of preparing an optical lens intermediate by cutting the optical lens base material that has been drawn in the drawing step; and a second cutting step of preparing the optical lens by cutting the optical lens intermediate.

BRIEF DESCRIPTION OF THE DRAWINGS

FIG. 5 is an overall view of an optical lens base material according to another embodiment.

BEST MODE FOR CARRYING OUT THE INVENTION

Embodiments of the present invention shall now be described in detail in accordance to the drawings. In the following description, the same or corresponding parts shall be provided with the same symbols and redundant description shall be omitted.

Figure 1A:
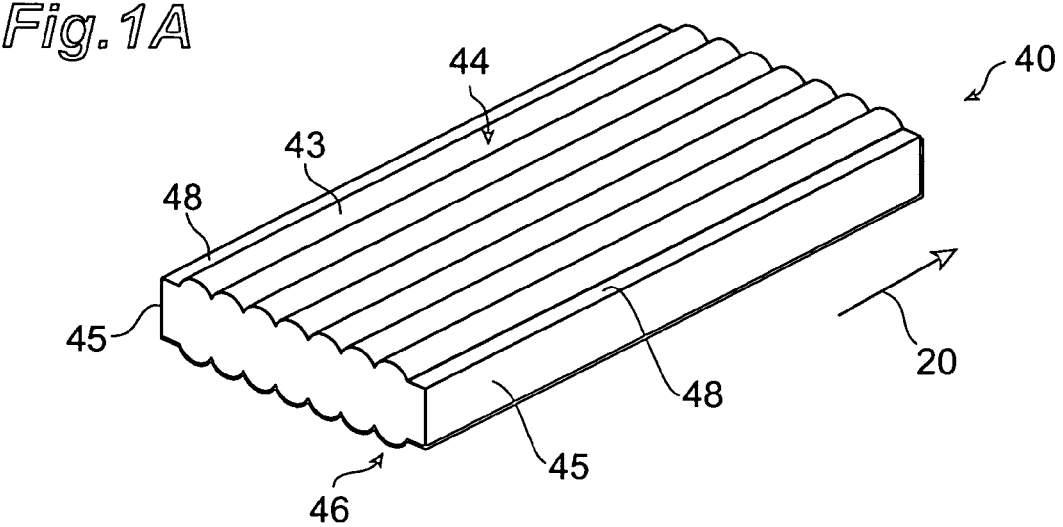
FIGS. 1A and 1B are schematic drawings showing the respective steps of an optical lens manufacturing method of an embodiment.

FIGS. 1A and 1B and FIGS. 2A and 2B are schematic views showing the respective steps in an optical lens manufacturing method of an embodiment of the present invention. As shown in FIG. 1A, first, an optical member formed of a light transmitting glass material is prepared, formed as a columnar shape provided with a first side face 44 and a second side face 46, and this is used as an optical lens base material 40 (optical lens base material preparation step). As the light transmitting glass material, for example, BK7 ((made by Schott Corp.); refractive index: 1.52; thermal expansion coefficient: $71 \times 10^{-7}$/K; yield point: 614° C.) is used. First side face 44 and second side face 46 are formed parallel to columnar axis direction 20.

In first side face 44 and second side face 46, a plurality of curved surface parts 43, which are parallel to columnar axis direction 20, are formed so as to be in mutual contact. Though in optical lens base material 40 of the present embodiment, these plurality of curved surface parts 43 are formed as convex curved surfaces, they may be formed as concave curved surfaces instead. Each of the plurality of curved surface parts 43 is a cylindrical surface such as a circular cylindrical surface and the plurality of cylindrical surfaces are positioned so as to extend along the same direction. Curved surface parts 43 may also be aspherical surfaces. These plurality of curved surface parts 43 are the parts that function as optical action components that act on incident light or emitted light after a drawing process. In the Figures, these plurality of curved surface parts and optical action components are provided with the same symbols.

At the respective edge parts of optical lens base material 40, which correspond to the respective sides of the plurality of curved surface parts 43, a pair of flange parts 48 are furthermore formed. The respective edge parts of optical lens base material 40 is strongly affected by heating in the drawing step and tend to deform, etc. However, since in optical lens base material 40 of the present embodiment, the pair of flange parts 48 are formed and flange parts 48 receive the influence of heating instead, the influence of heating is avoided more readily at the plurality of curved surface parts 43.

Thus, since with the method of manufacturing an optical lens by the drawing method, the shape of the optical lens to be manufactured, especially the shapes of the optical action components can be formed at the stage of optical lens base material 40, which is adequately large in size (for example, a width and height of 2 to 6 cm and a length of 20 to 200 cm), these forming processes can be performed in a simple and yet accurate manner.

Here, Japanese Patent Publication No. Hei-7-15521 discloses a method of manufacturing a refractive index distribution type cylindrical lens (selfoc lens) by the drawing method. In this manufacturing method, a high-purity quartz glass rod, in which the fluorine dopant amount increases in stages from the center towards the outer side in the radial direction and the refractive index decreases in stages accordingly, is used as the base material, and unlike the present invention, a base material, in which optical action components are formed in terms of shape, is not used. Though in such a prior-art manufacturing method required, as a base material preparation step, a step of forming a refractive index distribution by doping fluorine by a plasma external attachment method or a method of immersing in a fused salt over long period of time to perform ion exchange, such a step is unnecessary with the present invention. The prior art also differs from the present embodiment in that, in the optical lens that is formed, the light incidence surface and light exit surface does not make use of curved side faces of cylindrical type but make use of the respective end parts.

Figure 1B:
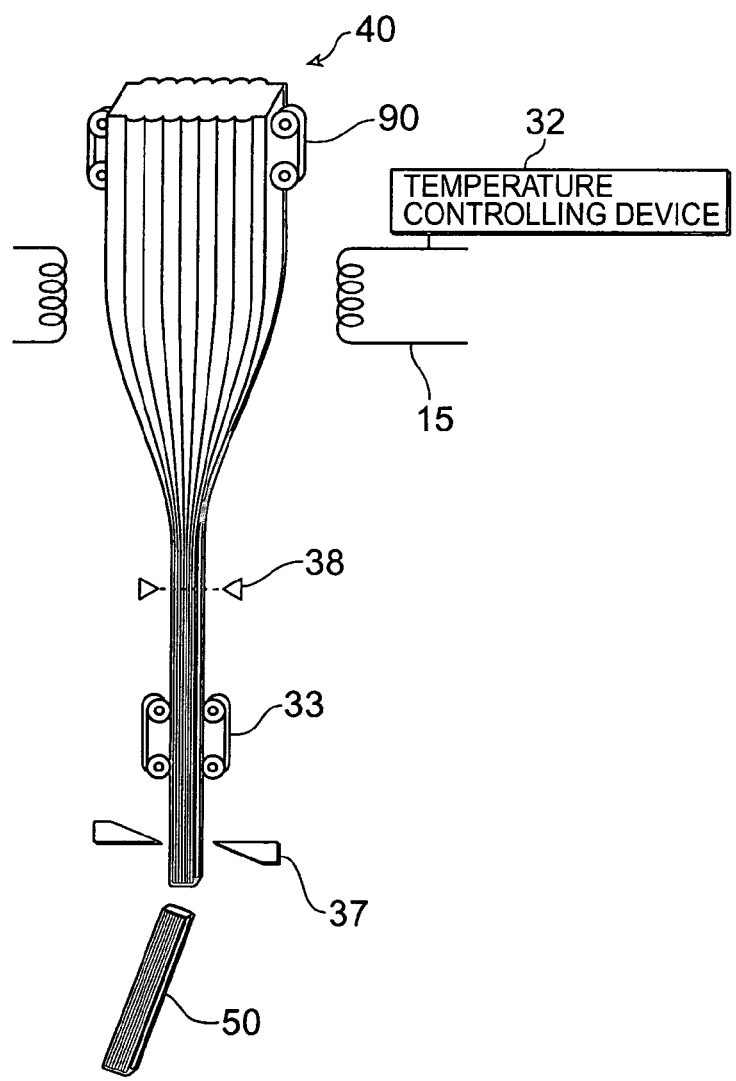

Next, as shown in FIG. 1B, optical lens base material 40, which has been molded in the above-described optical lens base material preparation step, is heated to the glass material's yield point or higher by an electrical furnace 35 as heating means and a drawing process is carried out to realize the desired dimensions (drawing step). It is preferable that electrical furnace 35 is formed in a ring-like manner so as to surround optical lens base material 40 and heats optical lens base material 40 uniformly from the surroundings. Electrical furnace 35 is connected to a temperature controlling device 32 that enables the temperature of electrical furnace 35 to be changed and the drawing process temperature to be adjusted. For drawing and stretching of the heated optical lens base material 40, lead-in rollers 90 and pull rollers 33 which lead optical lens base material 40 to electrical furnace 35 are used. By adjusting the rotation speed of lead-in rollers 90, the total heat amount of optical lens base material 40 may also be determined. In a case where optical lens base material 40 with a columnar shape as described above is to be drawn, when a pair of drawn roller contacting surfaces 45 are sandwiched by lead-in rollers 90 and pull rollers 33, twisting of optical lens base material 40 during the drawing process can be prevented.

When as a result of being drawn, optical lens base material 40 is judged to have the desired dimension (for example, 0.5 to 15 mm), it is cut by a cutter device 37 installed below pull roller 33 and a cut preform 50 with a length of 5 mm to 2000 mm is obtained (first cutting step). This judgment is made by means of a wire diameter measurement device 38 installed prior to pull rollers 33. This wire diameter measurement device 38 comprises a laser part, a light receiving part, and an analyzing part, and the light emitted from the laser part is transmitted through the drawn optical lens base material 40, the transmitted light is received by the light receiving part, and the dimension of the drawn optical lens base material 40 is computed by the analyzing part from the amount of light received, etc. The computation result is sent to a control part not illustrated, and if the dimension is the desired dimension, cutter device 37 is driven while if the dimension is not the desired dimension, the drawing process environment (adjustment of the rotation speed of lead-in rollers 90 and the drawing temperature, etc.) is adjusted.

Whereas in a case where an optical fiber, etc. is to be manufactured by a drawing process, the drawn object is wound around a drum, etc., the optical lens manufacture is characterized in that the drawn object is cut by cutter device 37, etc.

Figure 2A:
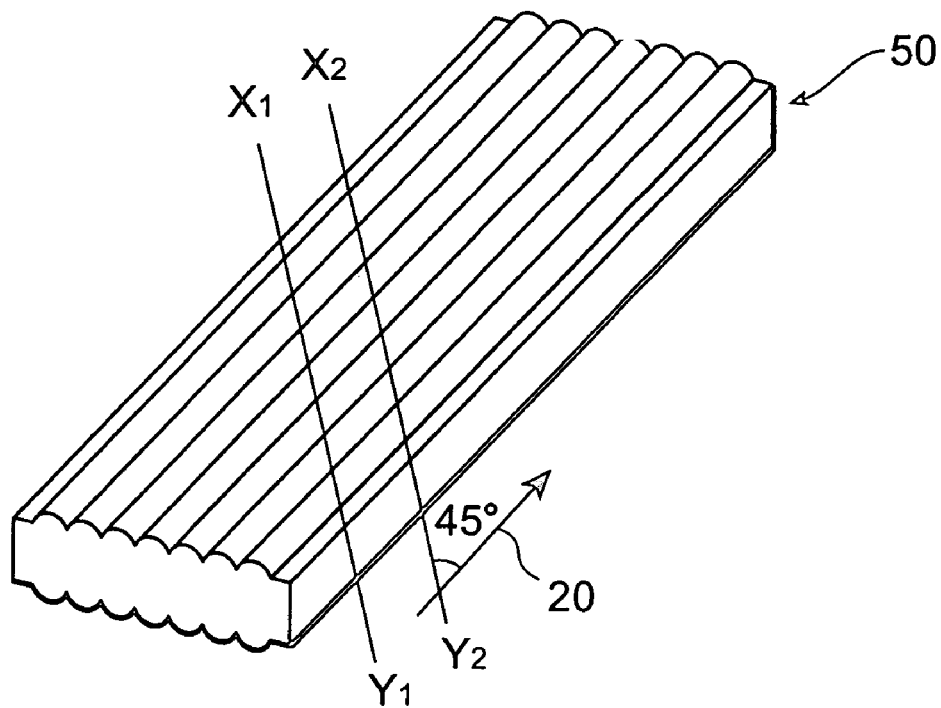
FIGS. 2A and 2B are schematic drawings showing the respective steps of the optical lens manufacturing method of the embodiment.
Figure 2B:
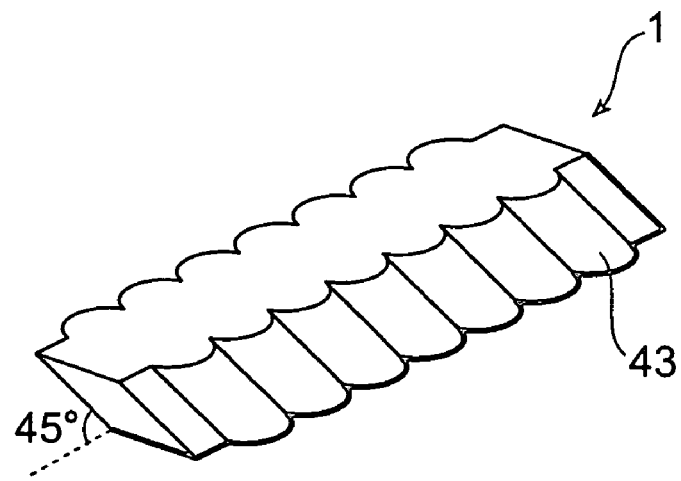

Next as shown in FIG. 2A, the cut preform 50 is cut along the $X_1$-$Y_1$ line and the $X_2$-$Y_2$ line, which are segments that form an angle of 45° with columnar axis direction 20 (second cutting process), to prepare an optical lens 1, such as shown in FIG. 2B (optical lens preparation step). The interval between these two lines is set to an interval corresponding to the thickness of the light emitting element (semiconductor laser element) to which the prepared optical lens is applied. By increasing the number of segments $X_k$-$Y_k$ (k=1, ... n) at which the cut preform 50 is to be cut, a large number of the same optical lenses can be prepared and mass production can thus be accommodated readily. Instead of dividing the cutting process into two parts, optical lens 1 may also be prepared in a single cutting process by cutting the drawn optical lens base material 40 at an angle inclined by 45° with respect to columnar axis direction 20.

Due to the characteristics of the drawing process, the cross-sectional shape of optical lens 1, which has been manufactured in the above-described manner, is the same as the cross-sectional shape of optical lens base material 40. In particular, since the shape of the optical action components that were prepared in the initial optical lens base material preparation step is carried over as it is even after the drawing process, there is no need to perform forming at a microscopic element stage after the drawing process. Furthermore with this embodiment's method of manufacturing optical lens 1, an optical lens 1, equipped with a plurality of curved surface parts 43, is prepared by a single drawing process, thus enabling the burden in terms of manufacturing to be lightened significantly.

Figure 3A:
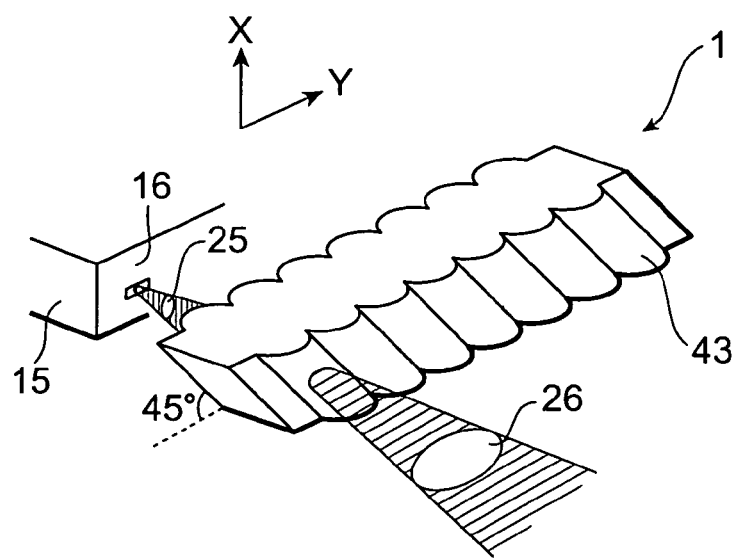
FIGS. 3A to 3C are diagrams illustrating the actions of optical lenses manufactured by the optical lens manufacturing method according to the embodiment.
Figure 3B:
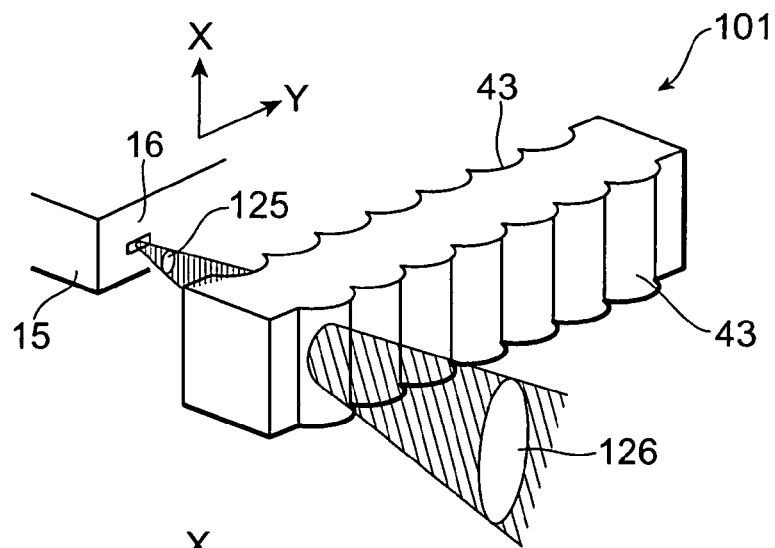
Figure 3C:
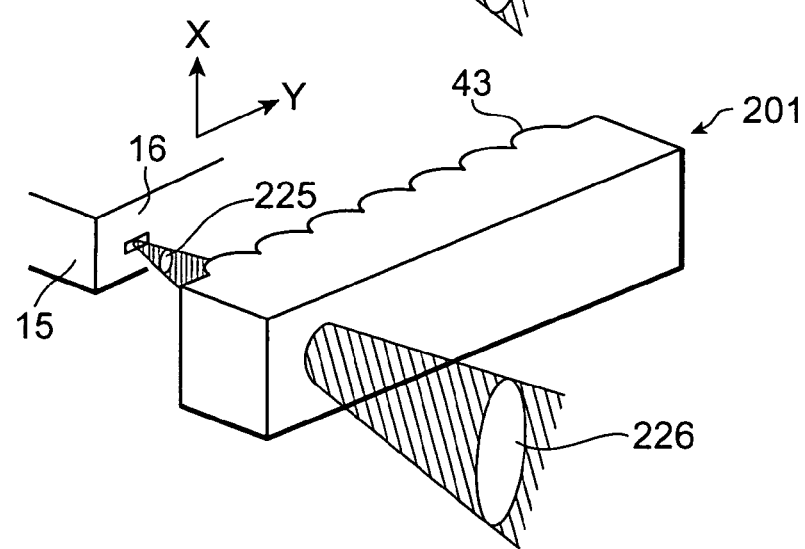

FIGS. 3A to 3C are diagrams illustrating the actions of optical lenses manufactured by the optical lens manufacturing method of the present embodiment. In each of these examples, since an optical lens 1, equipped with seven curved surfaces as optical action components 43, is formed, each light emitted, for example, from a semiconductor laser element, in which seven light emitting components are aligned, is subject to collimation, convergence, or optical path conversion and then emitted. The actions of the respective optical lenses 1, 101, and 201 shown here illustrate actions on incident light and do not necessarily illustrate actual application examples.

In optical lens 1 shown in FIG. 3A, the lights emitted from light emitting components 16 of a semiconductor laser element 15 is rotated by 90° about the optical axis as the central axis and then emitted as emitted lights by optical action components 43, which are formed in two rows at the light incidence side and light emitting side in a 45'-inclined state. Though light emitted from a light emitting component 16 has an optical section 25 that is short in the X-axis direction and long in the Y-axis direction, as a result of being subject to optical path conversion by optical lens 1, the light is converted to emitted light with an optical section 26 that is long in the X-axis direction and short in the Y-axis direction.

In optical lens 101 shown in FIG. 3B, the lights emitted from light emitting components 16 of semiconductor laser element 15 are collimated or converged in the X-axis direction and then emitted as emitted lights by optical action components 43, which are formed as concave curved surfaces and convex curved surfaces at the light incidence side and light emitting side, respectively. Though light emitted from a light emitting component 16 has an optical section 125 that is long in the X-axis direction and short in the Y-axis direction, as a result of being collimated or converged by optical lens 101, the light is converted to emitted light with an optical section 126 that is approximately the same in length in the X-axis direction as optical section 125 and longer in the Y-axis direction in comparison to optical section 125. Here, since with this embodiment's optical lens manufacturing method, two rows of curved surface parts can thus be prepared as optical action components 43 at the light incidence side and the light emitting side, a Fourier type or telescope type optical lens can also be formed.

In optical lens 201 shown in FIG. 3C, the lights emitted from light emitting components 16 of semiconductor laser element 15 are collimated or converged in the X-axis direction and then emitted as emitted lights by optical action components 43, which are formed as convex curved surfaces at the light incidence side. Though light emitted from a light emitting component 16 has an optical section 225 that is long in the X-axis direction and short in the Y-axis direction, as a result of being collimated or converged by optical lens 201, the light is converted to emitted light with an optical section 226 that is approximately the same in length in the X-axis direction as optical section 225 and longer in the Y-axis direction in comparison to optical section 225. In regard to the point that the incident light is collimated or converged in the X-axis direction, the same actions as those of optical lens 101 is provided. With optical lens 201, the light emitting side may be subject to a cutting process to newly form optical action components that can perform collimation or convergence in the Y-axis direction to arrange an optical lens that can perform collimation or convergence in both the X-axis direction and the Y-axis direction.

An optical lens manufacturing method of another embodiment of the present invention shall now be described with reference to FIGS. 4 to 7.

Figure 4A:
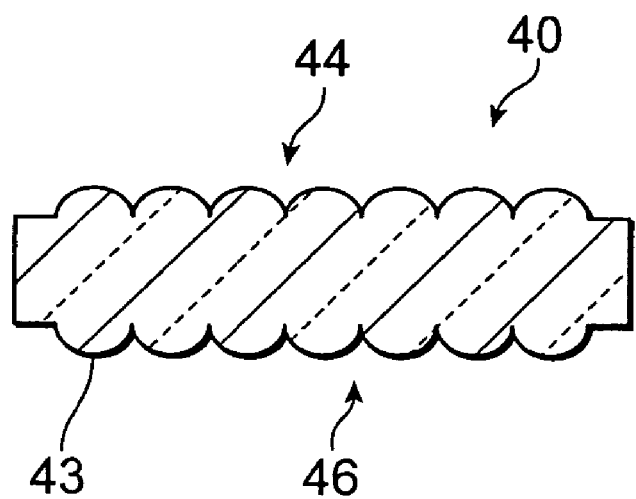
FIG. 4A is a sectional view of an optical lens base material according to the above-mentioned embodiment and FIG. 4B is a sectional view of an optical lens formed by drawing the optical lens base material shown in FIG. 4A.
Figure 4B:
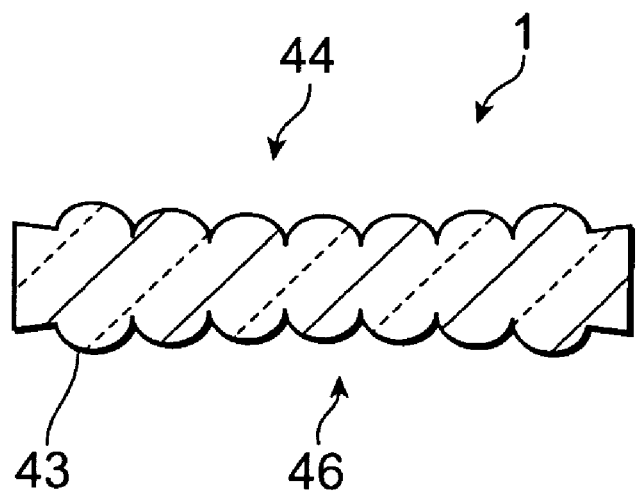

FIG. 4A is a sectional view of an optical lens base material of the above-described embodiment, and FIG. 4B is a sectional view of an optical lens formed by drawing the optical lens base material shown in FIG. 4A. The drawing step of the above-described embodiment is carried out at a drawing temperature that is higher than the yield point of optical lens base material 40 and yet at which deformation due to the drawing process is unlikely to occur with the shapes of curved surface parts 43 that are to become the optical action components. Though the drawing temperature is thus set to a low temperature in comparison to a case where an optical fiber, etc. is drawn, in the present process, the optical lens base material may deform in a manner wherein a flat part formed at a side face, that is, first side face 44 or second side face 46 shrinks inward throughout the drawing process. As shown straightforwardly in FIGS. 4A and 4B, optical lens 1 after drawing is deformed in a manner wherein both first side face part 44 and second side face part 46 of optical lens base material 40 are recessed inwards. Such deformation shall be referred to as a "pin-cushion distortion." With an optical lens that is affected by a pin-cushion distortion, it is difficult to accurately collimate or converge the respective lights, emitted by the respective light emitting components of a semiconductor laser element, as designed.

Figure 6A:
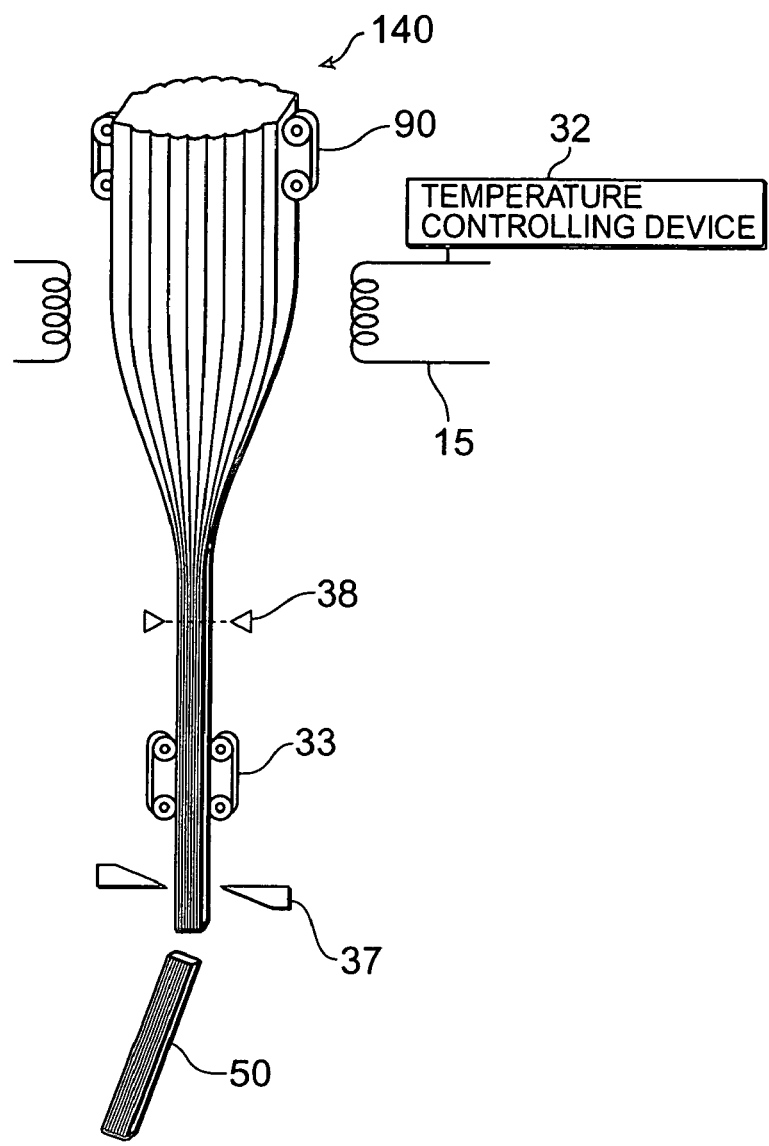
FIG. 6A is a diagram showing a step of drawing the optical lens base material shown in FIG. 5
Figure 6B:
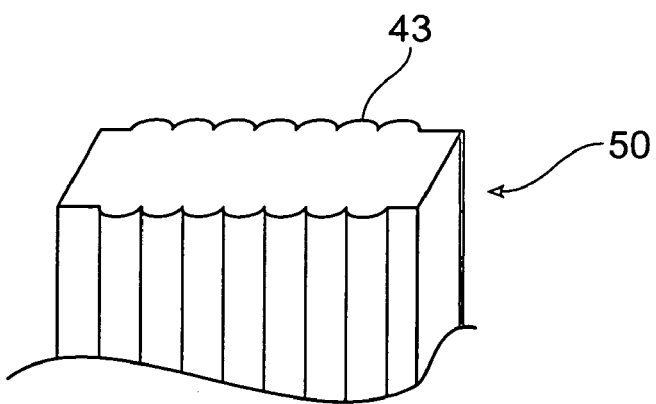
FIG. 6B is a partially enlarged view of a cut preform obtained by the drawing step illustrated in FIG. 6A.
Figure 7A:
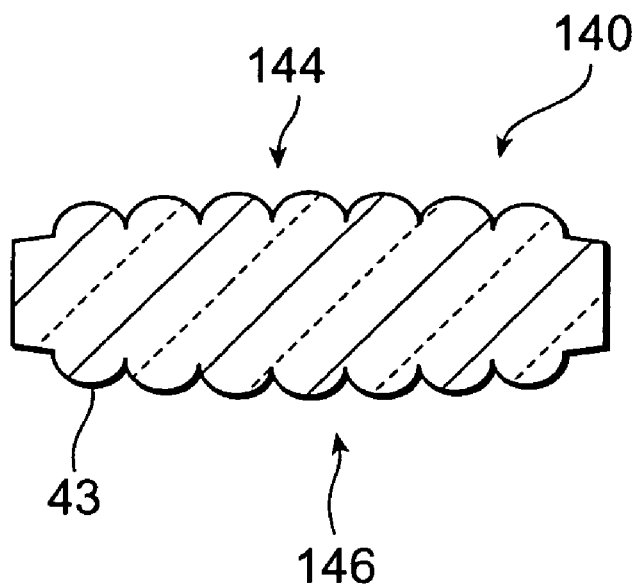
FIG. 7A is a sectional view of an optical lens base material of another embodiment and FIG. 7B is a sectional view of an optical lens formed by drawing the optical lens base material shown in FIG. 7A.
Figure 7B:
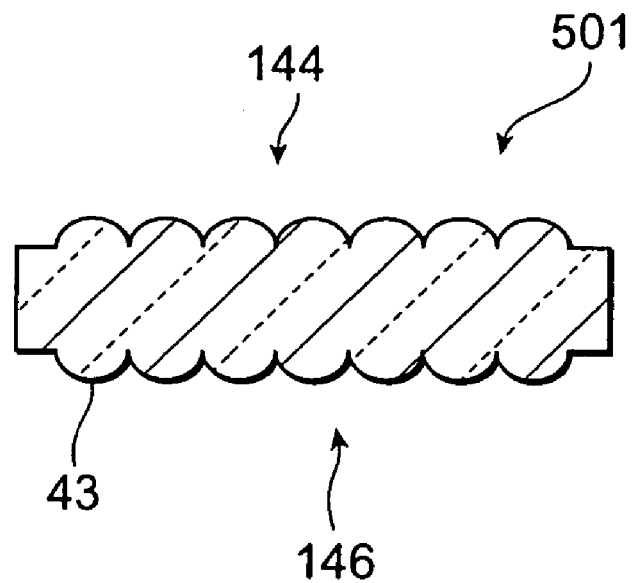

FIG. 5 is an overall view of an optical lens base material of another embodiment. FIG. 6A is a diagram illustrating a step of drawing the optical lens base material shown in FIG. 5, and FIG. 6B is a partially enlarged view of a cut preform obtained by the drawing step shown in FIG. 6A. FIG. 7A is a sectional view of an optical lens base material of another embodiment and FIG. 7B is a sectional view of an optical lens formed by drawing the optical lens base material shown in FIG. 7A. In optical lens base material 140, a first side face 144 and a second side face 146 are formed as convex curved surfaces as a whole. By forming first side face 144 and second side face 146 thus, the protruding parts are recessed inwards after the drawing process, so that an optical lens 501, which is closer to a plane (or is planar) and with which the influence of distortion due to drawing is restrained, is formed as shown in FIG. 6B or 7B. Thus with the optical lens manufacturing method of these other embodiments, an optical lens 501 that is equal to or close to the desired shape can be formed.

Though the present invention has been described specifically based on the embodiments, the present invention is not limited to the above-described embodiments in practice of the present invention and includes all changes of the invention within the scope of the Claims, and thus changes concerning the shape, size, positions, arrangement, etc. are possible.

Figure 8:
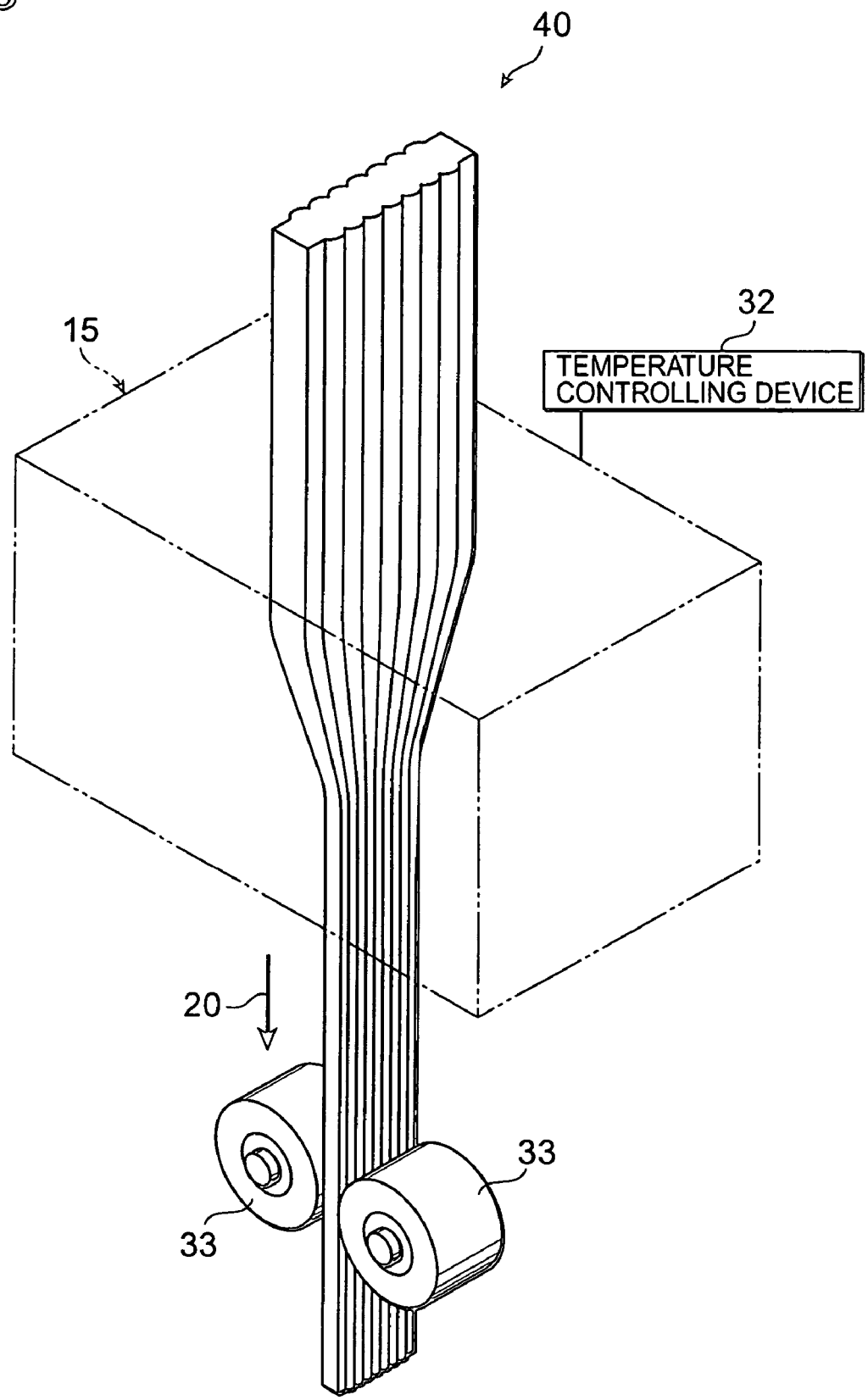
FIG. 8 is a schematic view showing a drawing step in another embodiment of an optical lens manufacturing method using the optical lens base material shown in FIG. 1A.
Figure 9:
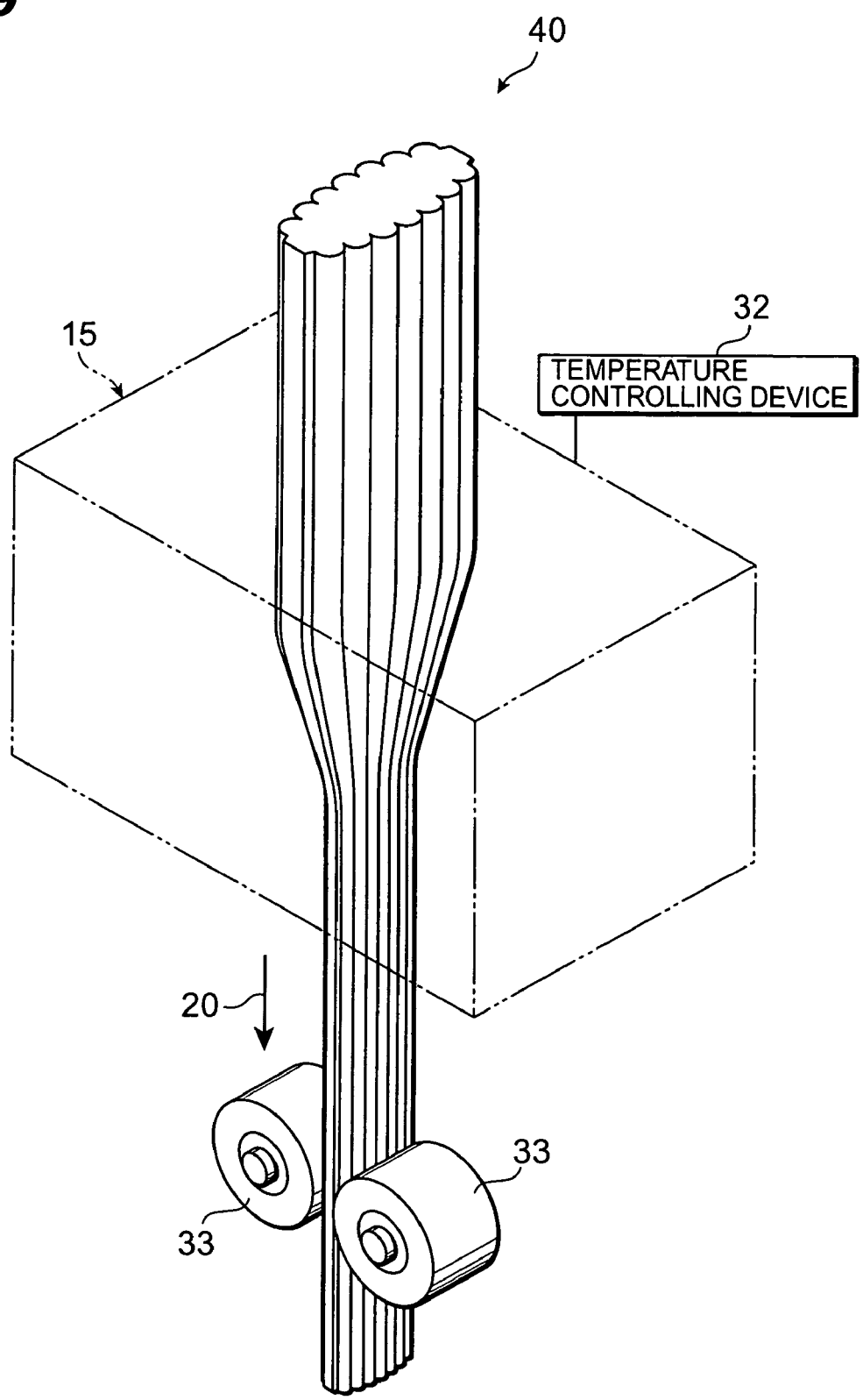
FIG. 9 is a schematic view showing a drawing step in another embodiment of an optical lens manufacturing method using the optical lens base material shown in FIG. 5.

For example, though with the above-described embodiments, in the process of drawing optical lens base material 40 as shown in FIG. 1A, the pair of roller contacting surfaces 45 of the drawn optical lens base material are sandwiched by pull rollers 33 as shown in FIG. 1B, it is preferable for first side face 44 and second side face 46 to be sandwiched by pull rollers 33 as shown in FIG. 8. First side face 44 or second side face 46 is wider than roller contacting surface 45. Thus by sandwiching first side face 44 and second side face 46 by pull rollers 33, the drawing process can be carried out in a stable manner. Also, by the same reason, in the process of drawing optical lens base material 140 shown in FIG. 5, it is preferable, instead of sandwiching the pair of roller contacting surfaces 45 of the drawn optical lens base material by pull rollers 33, to sandwich first side face 144 and second side face 146 by pull rollers 33.

Though U.S. Pat. No. 3,121,614 and British Patent Publication GB2108483A disclose methods of manufacturing a micro lens by a drawing process, these methods are methods of manufacturing a lens that acts on a single light and differs from the present invention in not being methods of manufacturing an optical lens that acts on a plurality of lights.

INDUSTRIAL APPLICABILITY

According to the optical lens manufacturing method of the present invention, since the shape of the optical lens, especially the shapes of the optical action components can be determined at a stage of the base material prior to drawing, the processing of the base material can be performed with good precision at an adequate size and the shape of the optical lens, especially the shapes of the optical action components can be formed readily. The burden in terms of manufacture can thus be lightened.

Also, since an optical lens that can act on the respective lights emitted from a light emitting element in which a plurality of light emitting components are aligned can be formed in a single drawing process, the manufacturing process can be reduced significantly.

What is claimed is:
1. A method of manufacturing an optical lens, comprising:
providing an optical lens base material which is formed of light transmitting material and has a columnar shape, the optical lens base material having a first side face and a second side face disposed opposite the first side face, each of the first side face and the second side face having a plurality of curved surface parts formed parallel to the columnar axis direction and aligned so as to be in mutual contact, and each of the first side face and the second side face are formed as convex curved surfaces as a whole, drawing the optical lens base material in the direction of the columnar axis;

recessing the first side face and the second side face inward; and cutting the optical lens base material to form an optical lens, the plurality of curved surface parts of the optical lens base material being optical action components that act on incident light or emitted light.

2. The method of manufacturing an optical lens according to claim 1, wherein cutting the optical lens base material to form an optical lens comprises cutting the optical lens base material along an inclination angle with respect to the columnar axis direction so that the plurality of curved surface parts of the optical lens are inclined with respect to the columnar axis direction.

3. The method of manufacturing an optical lens according to claim 2, wherein the inclination angle is 45°.

4. The method of manufacturing an optical lens according to claim 1, wherein cuffing the optical lens base material to form an optical lens comprises a first cuffing step of preparing a cut preform by cutting the optical lens base material, and a second cutting step of preparing the optical lens by cutting the cut preform prepared in the first cutting step to a desired size.

5. The method of manufacturing an optical lens according to claim 4, wherein the second cutting step comprises cutting the cut preform along an inclination angle with respect to the columnar axis direction so that the plurality of curved surface parts of the optical lens are inclined with respect to the columnar axis direction.

6. The method of manufacturing an optical lens according to claim 5, wherein the inclination angle is 45°.

* * * * *